(12) United States Patent
Kruglick

(10) Patent No.: US 9,367,292 B2
(45) Date of Patent: Jun. 14, 2016

(54) MODULATING DYNAMIC OPTIMIZATIONS OF A COMPUTER PROGRAM

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 188 days.

(21) Appl. No.: 13/582,937

(22) PCT Filed: Jun. 11, 2012

(86) PCT No.: PCT/US2012/041868
§ 371 (c)(1),
(2), (4) Date: Sep. 5, 2012

(87) PCT Pub. No.: WO2013/187864
PCT Pub. Date: Dec. 19, 2013

(65) Prior Publication Data
US 2013/0332710 A1    Dec. 12, 2013

(51) Int. Cl.
G06F 9/45    (2006.01)
G06F 9/455    (2006.01)

(52) U.S. Cl.
CPC ............ *G06F 8/443* (2013.01); *G06F 9/45525* (2013.01)

(58) Field of Classification Search
CPC .......................................... G06F 8/40–8/4443
USPC ....................................................... 717/153
See application file for complete search history.

(56) References Cited

U.S. PATENT DOCUMENTS

| 6,026,485 | A | 2/2000 | O'Connor et al. | |
|---|---|---|---|---|
| 6,412,107 | B1 * | 6/2002 | Cyran | G06F 9/45525 717/148 |
| 6,463,582 | B1 * | 10/2002 | Lethin | G06F 9/45504 717/138 |
| 6,760,907 | B2 * | 7/2004 | Shaylor | G06F 9/4431 712/E9.085 |
| 6,820,258 | B1 * | 11/2004 | Fink et al. | 717/158 |
| 6,948,160 | B2 * | 9/2005 | Click | G06F 9/45516 717/139 |

(Continued)

OTHER PUBLICATIONS

Lightweight Modular Staging: A Pragmatic Approach to Runtime Code Generation and Compiled DSLs—Tiark Rompf Martin Odersky—GPCE'10, Oct. 10-13, 2010, Eindhoven, The Netherlands.*

(Continued)

*Primary Examiner* — Francisco Aponte
(74) *Attorney, Agent, or Firm* — Brundidge & Stanger, P.C.

(57) ABSTRACT

Systems and methods for modulating dynamic optimizations of a computer program are disclosed. One method includes receiving an intermediate representation (IR) of machine executable instructions, optimizing the received IR to generate a first optimized IR prior to the machine executable instructions being generated by a runtime compiler, optimizing the received IR to generate two or more alternative optimizations for the IR, wherein the two or more alternative optimizations generating two or more optimized IRs are optimized at different optimization points based at least in part on information generated during execution of the first optimized IR in a runtime environment different optimization strategies, and modulating between the two or more alternative optimizations for the IR to use different ones of the alternative optimizations during execution of the machine executable instructions at a frequency based at least in part on a degree of difference between the two or more optimized IRs.

21 Claims, 3 Drawing Sheets

(56) References Cited

U.S. PATENT DOCUMENTS

| | | | | |
|---|---|---|---|---|
| 7,143,412 | B2* | 11/2006 | Koenen | G06F 9/5044 718/102 |
| 7,146,607 | B2* | 12/2006 | Nair | G06F 8/443 717/151 |
| 7,275,242 | B2* | 9/2007 | Liu | G06F 8/443 717/152 |
| 7,512,938 | B2* | 3/2009 | Tarditi, Jr. | G06F 8/437 717/146 |
| 7,543,285 | B2* | 6/2009 | Cabillic | G06F 9/30174 717/146 |
| 7,594,223 | B2* | 9/2009 | Hank | G06F 8/443 717/150 |
| 7,702,401 | B2 | 4/2010 | Eryurek et al. | |
| 7,793,275 | B2* | 9/2010 | Bobrovsky | G06F 9/45516 717/148 |
| 7,793,277 | B2 | 9/2010 | Schmidt | |
| 7,798,413 | B2 | 9/2010 | Bi et al. | |
| 8,181,169 | B2* | 5/2012 | Nakaike | G06F 1/3203 717/151 |
| 8,214,817 | B2* | 7/2012 | Mendelson | G06F 8/443 717/130 |
| 8,522,222 | B2* | 8/2013 | Tillmann | G06F 8/443 717/128 |
| 8,615,747 | B2* | 12/2013 | Beretta | G06F 8/443 717/136 |
| 8,832,672 | B2* | 9/2014 | Schmidt | G06F 8/443 717/140 |
| 2003/0070161 | A1* | 4/2003 | Wong et al. | 717/148 |
| 2003/0079210 | A1* | 4/2003 | Markstein et al. | 717/152 |
| 2004/0111714 | A1* | 6/2004 | Shi et al. | 717/148 |
| 2005/0125783 | A1* | 6/2005 | Tatge | G06F 8/54 717/152 |
| 2005/0188362 | A1* | 8/2005 | Metzger et al. | 717/151 |
| 2006/0212847 | A1* | 9/2006 | Tarditi | G06F 8/437 717/117 |
| 2007/0234325 | A1* | 10/2007 | Bobrovsky et al. | 717/151 |
| 2008/0235675 | A1* | 9/2008 | Chen | 717/147 |
| 2011/0088021 | A1* | 4/2011 | Kruglick | 717/149 |
| 2011/0088022 | A1* | 4/2011 | Kruglick | 717/153 |
| 2011/0191848 | A1* | 8/2011 | Zorn et al. | 726/22 |
| 2012/0151187 | A1* | 6/2012 | De Smet | G06F 8/52 712/220 |

OTHER PUBLICATIONS

The Benefits and Costs of DyC's Run-Time Optimizations Brian Grant, Markus Mock, Matthai Philipose, Craig Chambers, and Susan J. Eggers—University of Washington-ACM Transactions on Programming Languages and Systems, vol. 22, No. 5, Sep. 2000, pp. 932-972.*

Wikipedia Foundation, Inc., Just-in-time compilation, Aug. 8, 2012, accessed online via http://en.wikipedia.org/wiki/Just-in-time_compilation on Aug. 16, 2012.

Wikipedia Foundation, Inc., Side channel attack, Jul. 3, 2012, accessed online via http://en.wikipedia.org/wiki/Side_channel_attack on Aug. 16, 2012.

Ristenpart, et al., Hey, you, get off of my cloud: exploring information leakage in third-party compute clouds, in Proceedings of the 16th ACM Conference on Computer and Communications Security, 2009, 199-212.

Kassner, Fuzzy hashing helps researchers spot morphing malware, Apr. 4, 2011, accessed online via http://www.techrepublic.com/blog/security/fuzzy-hashing-helps-researchers-spot-morphing-malware/5274 on Aug. 16, 2012.

Izu, et al, Improved elliptic curve multiplication methods resistant against side channel attacks, Progress in Cryptology—INDOCRYPT 2002, Lecture Notes in Computer Science, 2002, pp. 296-313, vol. 2551/2002, London, UK.

Dehnert, et al, The Transmeta Code Morphing software: using speculation, recovery, and adaptive retranslation to address real-life challenges, Proceedings of the 1st Annual IEEE/ACM International Symposium on Code Generation and Optimization, Mar. 27-29, 2003, pp. 1-10, San Francisco, CA, USA.

Ebcioglu, et al, DAISY: Dynamic compilation for 100% architectural compatibility, Proceedings of the 24th international symposium on computer architecture, pp. 26-37, 1997.

Bala, et al, Dynamo: A transparent dynamic optimization system, PLDI '00 Proceedings of the ACM SIGPLAN 2000 Conference on Programming Language Design and Implementation, pp. 1-12, Jun. 2000, New York, NY, USA.

Albonesi, Selective cache ways: on-demand cache resource allocation, Proceedings of the International Symposium on Microarchitecture, pp. 248-259, IEEE Computer Society, Washington DC, USA, Nov. 1999.

Baraz, et al, "IA-32 execution layer: a two-phase dynamic translator designed to support IA-32 applications on Itanium® -based systems", Proceedings of the 36th Annual IEEE/ACM International Symposium on Microarchitecture (MICRO-36 2003), pp. 191-201, IEEE Computer Society, Washington DC, USA, Dec. 2003.

United States Patent and Trademark Office, International search report and written opinion of the international searching authority for PCT/US12/41868, Aug. 1, 2012, USA.

UWTV, Side channels and clouds: new challenges in cryptography, Aug. 30, 2012, accessed online via http://www.youtube.com/watch?v=6hQ5kvaEFkw on Aug. 17, 2012, USA.

".NET Downloads, Developer Resources & Case Studies," accessed at https://web.archive.org/web/20120610232519/http://www.microsoft.com/net/, accessed on Jan. 8, 2015, 2 pages.

Simon, H. D., "CS 267: Applications of Parallel Computers Lecture 17: Parallel Sparse Matrix-Vector Multiplication," accessed at https://web.archive.org/web/*/http://www.nersc.gov/~simon/cs267/Lect17-Sparse1.ppt, posted on Oct. 22, 2002, 66 pages.

* cited by examiner

300 A computer program product

302 A storage medium

304 Machine-readable instructions that, when executed by one or more processors, operatively enable a programming translation module to:

receive an intermediate representation (IR) of machine executable instructions;

perform an optimization of the received IR to produce one or more intermediately optimized IRs, the one or more intermediately optimized IRs being a predetermined percentage below that of a fully optimized IR;

utilize at least one of the one or more intermediately optimized IRs during an execution of the machine executable instructions;

store the one or more intermediately optimized IRs;

receive the IR at a dynamic run-time compiler;

receive the IR at a Just-in-Time (JIT) compiler;

receive byte-code;

receive virtual machine type instructions;

utilize, in a random manner, at least one of the one or more intermediately optimized IRs;

utilize, in a random time dependent manner, at least one of the one or more intermediately optimized IRs; and adjust, in a random manner, the predetermined percentage.

306 a computer-readable medium

308 a recordable medium

310 a communications medium

Fig. 3

MODULATING DYNAMIC OPTIMIZATIONS OF A COMPUTER PROGRAM

CROSS-REFERENCE TO RELATED APPLICATION

This application is the National Stage filing under 35 U.S.C. §371 of PCT Application No. PCT/US2012/041868 filed on Jun. 11, 2012.

BACKGROUND

Unless otherwise indicated herein, the approaches described in this section are not prior art to the claims in this application and are not admitted to be prior art by inclusion in this section.

Opportunities for a party to gain unauthorized access to digital information are continually increasing. This is particularly true as more and more computing devices (e.g., smart phones, tablet computers, laptop computers, desktop computers, servers, or the like) are accessible by a third party (e.g., via the Internet, or the like). Additionally, the rise in popularity of cloud computing technologies (e.g., shared datacenters, shared computing environments, or the like) has increased the opportunities for unauthorized access to digital information. A party may gain unauthorized access to digital information using a variety of techniques. One such technique, referred to as a "side channel attack," may extract digital information from parameters related to a process (e.g., a computer program, or the like). Side channel attacks may be used to access digital information, defeat cryptographic systems, or the like.

In general, a side channel attack may rely upon collocating with a target process. The side channel attack then, may facilitate accessing (e.g., reading, observing, or the like) information (e.g., memory addresses, cryptographic keys, or the like) related to the target process using indirect means. More specifically, a side channel attack may identify execution of the target process (e.g., by memory block availability observation, by CPU core throttling observation, by memory cache observation, or the like). Then, activity related to the target process may be extracted from the system. Often, related activity may be extracted using similar techniques that were used to identify the target process. Additionally, known characteristics (e.g., timing, resource usage, CPU instruction sets, or the like) related to the computing environment may also be used to extract activity related to the target process.

Conventional countermeasures to side channel attacks may involve adding complex mathematical computations to the target process, performing repeated computation on "fake" data, or the like. However, as can be appreciated, these countermeasures may require modification of the source code of the target process, may increased computational overhead, or the like.

SUMMARY

Detailed herein are various illustrative methods for modulating dynamic optimizations of a computer program during execution. Example methods may include receiving an intermediate representation (IR) of machine executable instructions, performing an optimization of the received IR to generate one or more of intermediately optimized IRs, the one or more intermediately optimized IRs being within a predetermined percentage below that of a fully optimized IR, and utilizing at least one of the one or more intermediately optimized IRs during an execution of the machine executable code.

The present disclosure also describes various example machine readable non-transitory medium having stored therein instructions that, when executed, cause a device to modulate dynamic optimizations of a computer program during execution. Example machine readable non-transitory media may have stored therein instructions that, when executed by one or more processors, operatively enable a programming translation module to receive an intermediate representation (IR) of machine executable instructions, perform an optimization of the received IR to produce one or more intermediately optimized IRs, the one or more intermediately optimized IRs being a predetermined percentage below that of a fully optimized IR, and utilize at least one of the one or more intermediately optimized IRs during an execution of the machine executable instructions.

The present disclosure additionally describes example systems. Example systems may include a processor, a programming translation module communicatively coupled to the processor, and a machine readable medium having stored therein instructions that, when executed by the processor, operatively enable the programming translation module to receive an intermediate representation (IR) of machine executable instructions, perform an optimization of the received IR to generate one or more intermediately optimized IRs, the one or more intermediately optimized IRs being a predetermined percentage below that of a fully optimized IR, and utilize at least one of the one or more intermediately optimized IRs during an execution of the machine executable instructions.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings:

FIG. 3 is an illustration of an example computer program product; and

DETAILED DESCRIPTION

Figure 1:
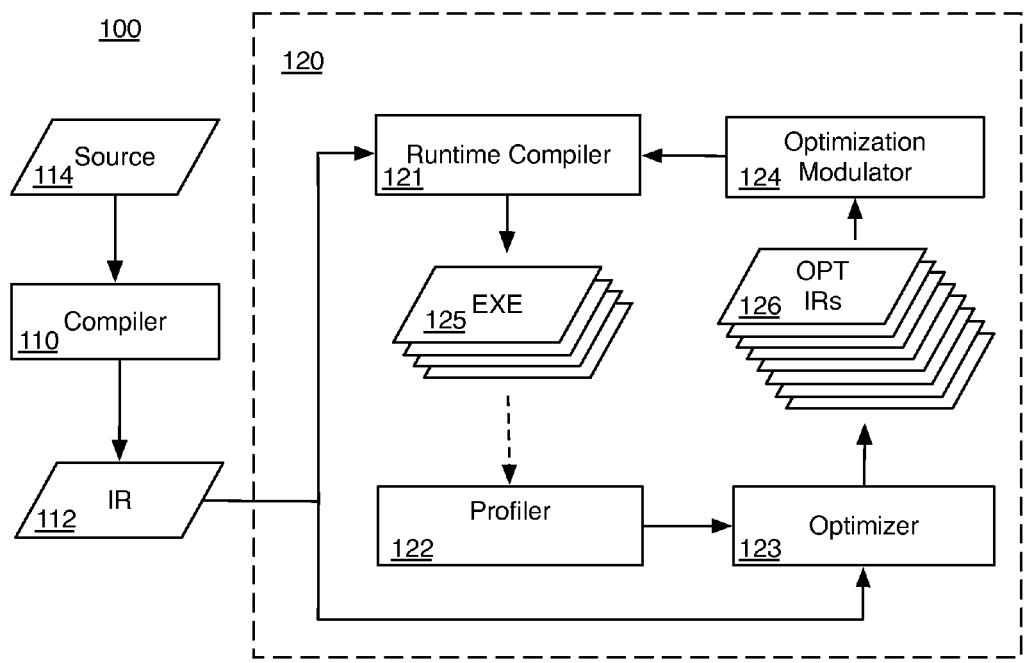
FIG. 1 is an illustration of a block diagram of an example "just-in-time" (JIT) compilation environment.

The following description sets forth various examples along with specific details to provide a thorough understanding of claimed subject matter. It will be understood by those skilled in the art that claimed subject matter might be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to modulating dynamic optimizations of a computer program during execution.

As indicated above, information (e.g., digital data, cryptographic information, or the like) may be vulnerable to side channel attacks. This is particularly true as parties are increasingly sharing computing resources (e.g., shared datacenters, shared computing environments, or the like). For example, a party may access information related to another party's computational process executing in the same shared computing environment by extracting the information indirectly (e.g., with as side channel attack as introduced above) from the shared computing environment.

In general, various embodiments of the present disclosure may modify portions of a computer program (e.g., the architecture, the memory usage, the execution strategy, or the like) dynamically as the computer program is executing. As such, the difficulty of correlating indirect information (e.g., memory usage, processor load, cache access or the like) to information associated with the computer program may be increased. Accordingly, the resistance of the computer program to a side channel attack may also be increased. Various embodiments of the present disclosure may be implemented (e.g., by a shared computing environment provider, a computer program, a security system, a cryptographic system, or the like) with the intent to provide resistance to a side channel attack. It is to be appreciated, that a benefit of various embodiments of the present disclosure may be resistance to side channel attacks. Accordingly, although resistance to side channel attacks may be referenced throughout this disclosure, it is not a requirement of the various embodiments detailed herein.

As indicated above, various embodiments of the present disclosure may include modifying a computer program during execution. For example, some embodiments of the present disclosure may be implemented in conjunction with a Just-In-Time (JIT) compilation environment. Accordingly, the JIT compilation environment may be configured to dynamically modify the computer program during execution. More specifically, by way of example and not limitation, the JIT compilation environment may be configured to modulate between various optimization strategies used during runtime compilation of the computer program. As a result, characteristics of the computer program (e.g., the resource distribution between memory and computation, memory locations, loop branching, or the like) may be modified.

As will be appreciated, these modifications may increase the difficulty of identifying and accessing information using a side channel attack. By way of further example (again without limitation), a cloud-computing provider may implement a JIT compilation environment as detailed above. Accordingly, the cloud-computing provider may offer a potential increase in side channel attack resistance to its customers. Furthermore, this benefit may not necessitate that the customers modify their computer programs in order to be compatible with the cloud computing provider's JIT compilation environment.

Additionally, various embodiments of the present disclosure may be implement (e.g., by a cloud computing provider, or the like) without the knowledge of a user (e.g., a customer, or the like). Furthermore, the impact of modulating between various optimization strategies can be adjusted, by for example changing an allowed level of efficiency. As such, various levels of service (e.g., security policies, cost structures, computational efficiency, or the like) may be provided in conjunction with offering the benefits of increased side channel resistance detailed above.

Although various embodiments detailed herein are illustrated using a JIT compilation environment, some embodiments may be implemented using other compilation techniques. For example, an interpreted compilation environment may be used to implement at least some embodiments of the present disclosure. Additionally, a static compilation environment may be used to implement at least some embodiments of the present disclosure.

FIG. 1 illustrates an example JIT compilation environment 100, arranged in accordance with at least some embodiments of the present disclosure. The JIT compilation environment 100 may be used to facilitate execution of a software program (not shown) by a computing device (not shown). As will be appreciated, software programs may generally need to be translated (e.g., compiled, or the like) into instructions (e.g., machine code, or the like) that are executable by the computing device upon which they will eventually be run. The JIT compilation environment 100 may allow for at least some portion of the software program to be translated at runtime, that is, when the program is executing on the computing device. Accordingly, the JIT compilation environment 100 may include a source compiler 110 and a runtime environment 120.

In general, the source compiler 110 may generate an intermediate representation (IR) 112 of source code 114. Subsequently, the runtime environment 120 may use the IR 112 to facilitate execution of the software program by the computing device. The source code 114 may be any suitable source code file for a computer program, which the source compiler 110 may be capable of translating into the IR 112. Furthermore, a variety of languages (e.g., Java, C#, C++, Ruby, Python, Javascript, Dart or the like) may be used to express the source code 114.

The IR 112, sometimes referred to as "bytecode", an "object file", or a "thin binary", may not be "machine code". More specifically, the IR 112 may not be natively executable by a computing device. However, as will be appreciated, the IR 112 may be portable among computer architectures. That is, the IR 112 may not be specific to a particular type (e.g., processor architecture, operating system, memory address size, or the like) of computer. Accordingly, the IR 112, along with an appropriate runtime environment 120 may be used to execute the software program on a variety of different computing devices. As will be appreciated, with some embodiments, the JIT compilation environment 100 may be implemented on a single computing device (e.g., a desktop computer, a server, a virtual machine, or the like). Additionally, with some embodiments, portions of the JIT compilation environment 100 may be implemented on multiple computing devices. For example, the runtime environment 120 may be implemented on one computing device while the compiler 110, the IR 112 and the source 114 may be implemented on another computing device.

As will be appreciated, the source code 114 may define the software program referenced in conjunction with FIG. 1. Accordingly, the IR 112 may also define the software program. As will be further appreciated, a benefit of having the runtime environment 120 use the IR 112 to execute the software program may be so that the developer does not need to distribute the source code 114, or alternatively, distribute a number of executable files specific to different computer architectures and operating systems. For example, a software developer may use the source compiler 110 to generate the IR 112, which it then distributes. Then, anyone with the appropriate runtime environment 120 may execute the software program. Accordingly, with some embodiments of the present disclosure, a runtime environment that uses the source code 114 may be provided. Additionally, with some embodiments of the present disclosure, only the runtime environment 120 and the IR 112 may be provided.

The runtime environment 120 may include a runtime compiler 121 a profiler 122, an optimizer 123 and an optimization modulator 124. In general, the runtime compiler 121 may generate executable files 125, which the profiler 122 may then profile. The optimizer 123 may generate a set of optimized IRs 126 based on the profiling, which the optimization modulator 124 may switch between during operation of the runtime environment 120. More specifically, the optimization modulator 124 may cause the runtime environment 120 to use different ones of the optimized IRs 126 during execution of the software program.

As stated, the runtime compiler 121 may generate the executable files 125 (e.g., machine code, or the like) from the IR 112. The computing device (e.g., upon which the runtime environment 120 is operating, a computing device in communication with the computing device upon which the runtime environment 120 is operating, or the like) may then use the executable files 125 to execute the software program. The runtime compiler 121 may generate the executable files 125 as the software program is executing. Furthermore, the runtime compiler 121 may generate a subset of the executable files 125 at any particular time during operation. For example, the runtime compiler 121 may only translate portions of the IR 112 that are necessary to execute a desired portion of the software program into executable files 125. In some implementations, the runtime environment 120 may cache the executable files 125 for later reuse.

The profiler 122 may collect statistics (e.g., memory usage, function execution frequency, function execution duration, instruction use frequency, or the like) about how the executable files 125 are executing in the runtime environment 120. The optimizer 123 may then optimize (e.g., inline library functions, move a hash table from being computed to being stored in memory, invert a loop, skew a loop, or the like) the IR 112 (or a portion of the IR 112) based on the collected statistics. More particularly, the optimizer 123 may generate optimizations (e.g., compilation settings, compilation strategies, or the like), which may be used by the runtime compiler 121 when the executable files 125 are generated from the IR 112. Although reference is made herein to "optimizing the IR 112", "generating intermediately optimized IRs", or similar, it is to be appreciated, that with some of the disclosed embodiments, the IR 112 may be "optimized" by adjusting the settings for compiling the IR 112 into the executable files 125.

As will be appreciated, the compilation, profiling, and optimization loop may be dynamic. That is, it may operate as the runtime environment 120 is operating. For example, the runtime compiler 121 may compile some executable files 125 from the IR 112. Subsequently, the profiler 122 may collect statistics about the execution of the executable files 125. After which, the optimizer 123 may generate optimizations for the IR 112 based on the collected statistics. The runtime compiler 121 may then recompile the IR 112 based on the generated optimizations. The runtime environment 120 may again cache the executable files 125 for later use.

With various embodiments of the present disclosure, the optimizer 123 may store multiple intermediately optimized IRs 126. More particularly, the optimizer 123 may store a number of alternative optimizations for the IR 112, referred to herein as "intermediately optimized IRs" 126. For example, without limitation, the optimizer 123 may generate optimizations for the IR 112 using two different optimization strategies (e.g., based on different versions of the same compiler, favoring different optimization techniques, setting different effective optimization costs for various system resources, limiting selection of algorithm types, randomly optimizing the IR to a predetermined percentage below that of fully optimized, or the like) and then store the various optimizations strategies as the optimized IRs 126.

As stated, with some embodiments of the present disclosure, the optimized IRs 126 may be optimized to some degree (e.g., a percentage, a measure of performance, a number of optimizations, a number of compilation settings, or the like) less than fully optimized. It is to be appreciated, that although the optimized IRs 126 are referred to herein as being less than fully optimized, their performance may be less than, substantially equal to, or greater than that of a fully optimized IR (e.g., an IR that was compiled using "ideal" optimizations, or the like). More specifically, the optimized IRs 126 may be optimized to different optimum points. For example, the optimized IRs 126 may correspond to compilation settings where memory block size is different for each optimized IR 126.

With some embodiments of the disclosed subject matter, the optimization points (e.g., the level of optimization, or the like) for each optimized IR 126 may be based on resource usage (e.g., maximum allowable resource usage, or the like) or security level (e.g., based on threat level, deployment site security, or the like). Additionally, the optimizer 123 may determine the number of optimized IRs 126 to generate based on a population criteria (e.g., minimum number of alternatives, minimum population signature difference product, or the like).

In some embodiments of the present disclosure, the optimizer 123 may determine optimization points for each optimized IR 126 by varying (e.g., randomly, periodically, on a schedule, or the like) an optimization fitness function (e.g., adjust cost of processing resources, adjust cost of memory use, or the like).

With some embodiments of the present disclosure, the different optimum points may be determined over time based on information from the profiler 122. For example, the optimizer 123 may utilize artificial intelligence techniques (e.g., using machine learning, fuzzy logic, or the like) to determine various optimization points meeting specific criteria (e.g., performance measure, difference between other optimization points, or the like), which may then be used to generate the optimized IRs 126.

In some embodiments of the disclosed subject matter, the optimizer 123 may generate the optimized IRs 126 using a combination of techniques (e.g., specified criteria, variation of a fitness function, learning over time, or the like).

As indicated above, in various embodiments of the disclosed subject matter, the optimizer 123 may generate the optimized IRs 126. Furthermore, as stated, in some embodiments, this process is dynamic. That is, the optimizer 123 may repeatedly generate optimized IRs 126 based on information the profiler 122 generates as the IR 112 is run using the runtime environment 120. With some embodiments of the disclosed subject matter, for example, the first time the runtime environment 120 is operated for a particular IR (e.g., the IR 112), the optimized IRs 126 may be created prior to the executable files being generated by the runtime compiler 121.

The optimization modulator 124 may then modulate (e.g., randomly, periodically, based on an operating signature, or the like) which of the optimized IRs 126 the runtime compiler 121 uses to compile (or recompile) the executable files 125. For example, if the operating signatures (e.g., based on hashes, or the like) for the optimized IRs 126 are significantly different, then the optimization modulator 124 may switch between optimized IRs 126 slower than if the operating signatures were slightly different. Furthermore, the optimization modulator 124 may enable and disable the modulation between optimized IRs 126 based on a security level. For example, if all processes executing on a computing device (e.g., computer, server, virtual machine, distributed computing node, or the like) are friendly (e.g., owned by the same entity, certified as "safe", or the like) the optimization modulator 124 may disable modulation between optimized IRs 126.

Figure 2:
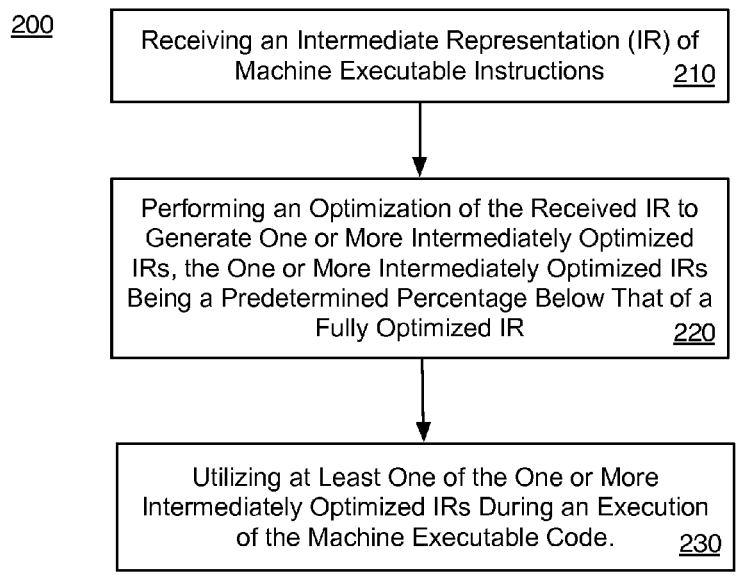
FIG. 2 is an illustration of a flow diagram of an example method for modulating dynamic optimizations of a computer program.

FIG. 2 illustrates a flow chart of an example method for modulating dynamic optimizations of a computer program during execution, arranged in accordance with at least some embodiments of the disclosed subject matter. In some portions of the description, illustrative implementations of the method are described with reference to elements of the JIT compilation environment 100 depicted in FIG. 1. However, the described embodiments are not limited to this depiction. More specifically, some elements depicted in FIG. 1 may be omitted from some implementations of the methods detailed herein. Furthermore, other elements not depicted in FIG. 1 may be used to implement example methods detailed herein.

Additionally, FIG. 2 employs block diagrams to illustrate the example methods detailed therein. These block diagrams may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and other not described, rearrangements, substitutions, changes, modifications, etc., may be made without departing from the scope of claimed subject matter.

FIG. 2 illustrates an example method 200 for modulating dynamic optimizations of a computer program during execution. Beginning at block 210 ("Receive an Intermediate Representation (IR) of Machine Executable Instructions"), the runtime environment 120 may include logic and/or features configured to receive an intermediate representation (IR) of machine executable instructions. In general, at block 210, the optimizer 123 may receive the IR 112. For example, the optimizer 123 may receive the IR 112 by accessing the IR 112 from a storage location where the IR 112 is stored. Alternatively, the optimizer 123 may receive the IR 112 by for example, downloading the IR 112 from a server where the IR 112 is stored. Alternatively, the optimizer 123 may receive the IR 112 from a compiler 110 within the same environment that has generated IR 112 from source 114.

Continuing from block 210 to block 220 ("Perform an Optimization of the Received IR to Generate One or More Intermediately Optimized IRs, the One or More Intermediately Optimized IRs Being a Predetermined Percentage Below That of a Fully Optimized IR"), the optimizer 123 may include logic and/or features configured to perform an optimization of the received IR to generate intermediately optimized IRs. In general, at block 220, the optimizer 123 may apply one or more different optimizations to the IR 112; as a result, one or more optimized IRs 126 will be generated. As indicated above, in some embodiments, the optimized IRs 126 corresponds to different optimization points (e.g., different compilation strategies, or the like). For example, the optimized IRs 126 may be optimized using only a percentage of available optimizations. Additionally, the optimized IRs 126 may be optimized using different optimization strategies (e.g., based on different versions of the same compiler, favoring different optimization techniques, randomly optimizing the IR to a predetermined percentage below that of fully optimized, or the like). Additionally, the optimized IRs 126 may be optimized using different optimization fitness functions. However, as detailed above, the optimized IRs 126 may not necessarily have lower performance characteristics than the IR 112 optimized using ideal conditions.

Continuing from block 220 to block 230 ("Utilize at Least One of the One or More Intermediately Optimized IRs During an Execution of the Machine Executable Code"), the optimization modulator 124 may include logic and/or features configured to modulate which optimized IRs 126 the runtime compiler 121 uses to generate the executable files 125. In general, the optimization modulator 124 may modulate (e.g., randomly, periodically, based on an operating signature, based on events, or the like) which of the optimized IRs 126 the runtime compiler 121 uses to recompile the executable files 125. For example, if the operating signatures (e.g., based on hashes, or the like) for the optimized IRs 126 are significantly different, then the optimization modulator 124 may switch between optimized IRs 126 slower than if the operating signatures were slightly different.

In general, the method described with respect to FIG. 2 and elsewhere herein may be implemented as a computer program product, executable on any suitable computing system, or the like. For example, a computer program product for modulating dynamic optimizations of a computer program may be provided. Example computer program products are described with respect to FIG. 3 and elsewhere herein.

FIG. 3 illustrates an example computer program product 300, arranged in accordance with at least some embodiments of the present disclosure. Computer program product 300 comprises machine readable non-transitory medium having stored therein instructions that, when executed, cause the machine to modulate dynamic optimizations of a computer program according to the processes and methods discussed herein. Computer program product 300 is embodied on a non-transitory storage medium 302. Storage medium 302 comprises one or more machine-readable instructions 304, which, when executed by one or more processors, may operatively enable a computing device to provide the functionality described herein. In various examples, some or all of the machine-readable instructions may be used by the devices discussed herein.

In some examples, the machine readable instructions 304 may include receiving an intermediate representation (IR) of machine executable instructions. In some examples, the machine readable instructions 304 may include performing an optimization of the received IR to produce one or more intermediately optimized IRs, the one or more intermediately optimized IRs being a predetermined percentage below that of a fully optimized IR. In some examples, the machine readable instructions 304 may include utilizing at least one of the one or more intermediately optimized IRs during an execution of the machine executable instructions. In some examples, the machine readable instructions 304 may include storing the one or more intermediately optimized IRs. In some examples, the machine readable instructions 304 may include receiving the IR at a dynamic run-time compiler. In some examples, the machine readable instructions 304 may include receiving the IR at a Just-in-Time (JIT) compiler. In some examples, the machine readable instructions 304 may include receiving byte-code. In some examples, the machine readable instructions 304 may include receiving virtual machine type instructions. In some examples, the machine readable instructions 304 may include utilizing, in a random manner, at least one of the one or more intermediately optimized IRs. In some examples, the machine readable instructions 304 may include utilizing, in a random time or event dependent manner, at least one of the one or more of the intermediately optimized IRs. In some examples, the machine readable instructions 304 may include adjusting, in a random manner, the predetermined percentage.

In some implementations, storage medium 302 comprises a computer-readable medium 306, such as, but not limited to, a hard disk drive, a Compact Disc (CD), a Digital Versatile Disk (DVD), a digital tape, memory, etc. In some implementations, the storage medium 302 may encompass a recordable medium 308, such as, but not limited to, memory, read/write (R/W) CDs, R/W DVDs, etc. In some examples, the storage medium 302 may encompass a machine readable non-transitory medium.

In general, the methods described with respect to FIG. 2 and elsewhere herein may be implemented in any suitable server and/or computing system. Example systems may be described with respect to FIG. 4 and elsewhere herein. In some examples, a resource, data center, data cluster, cloud computing environment, or other system as discussed herein may be implemented over multiple physical sites or locations. In general, the computer system may be configured to modulate dynamic optimizations of a computer program.

Figure 4:
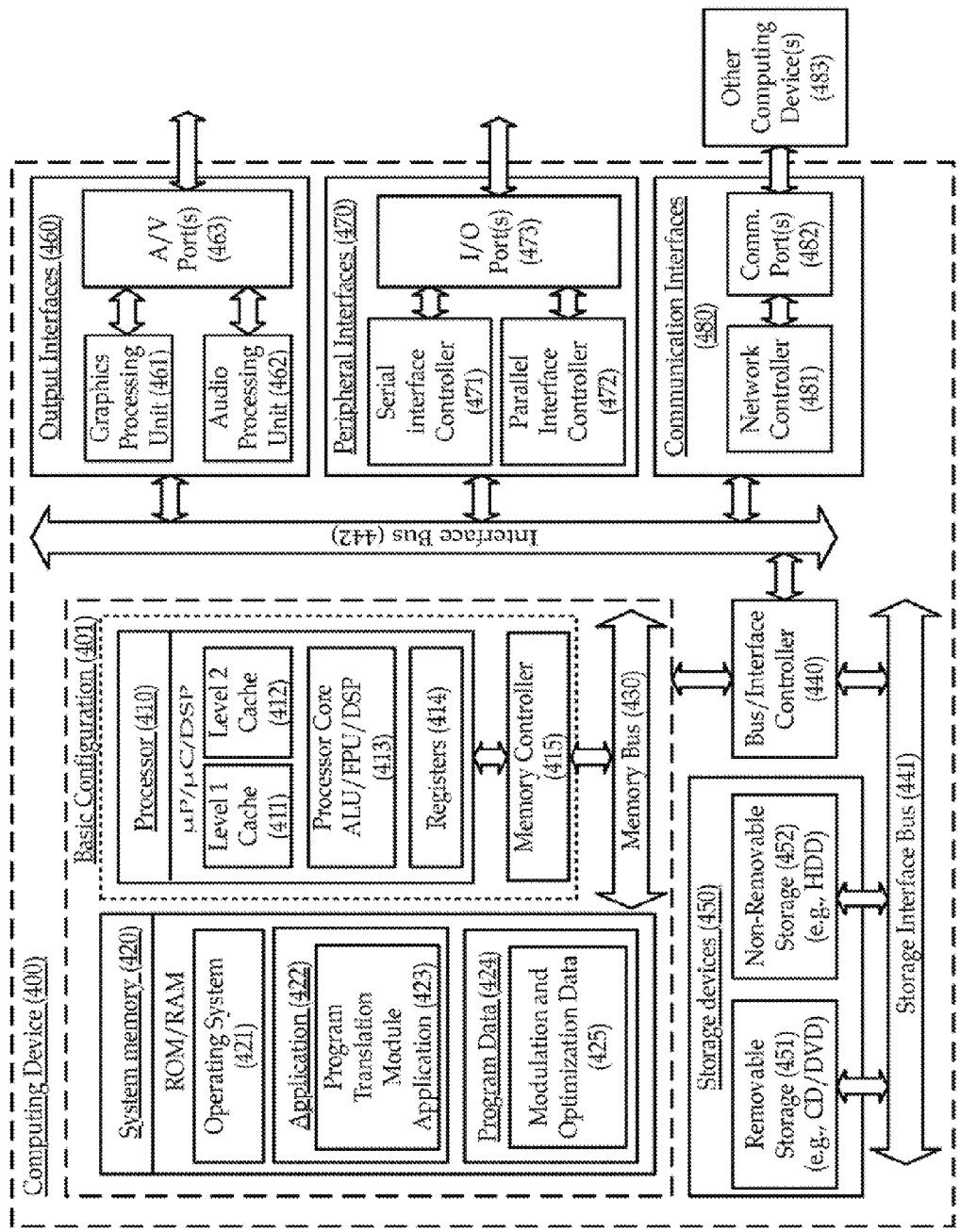
FIG. 4 is an illustration of a block diagram of an example computing device, all arranged in accordance with at least some embodiments of the present disclosure.

FIG. 4 is a block diagram illustrating an example computing device 400, arranged in accordance with at least some embodiments of the present disclosure. In various examples, computing device 400 may be configured to modulate dynamic optimizations of a computer program as discussed herein. In various examples, computing device 400 may be configured to modulate dynamic optimizations of a computer program as a server system or as a tool as discussed herein. In one example of a basic configuration 401, computing device 400 may include one or more processors 410 and a system memory 420. A memory bus 430 can be used for communicating between the one or more processors 410 and the system memory 420.

Depending on the desired configuration, the one or more processors 410 may be of any type including but not limited to a microprocessor (µP), a microcontroller (µC), a digital signal processor (DSP), or any combination thereof. The one or more processors 410 may include one or more levels of caching, such as a level one cache 411 and a level two cache 412, a processor core 413, and registers 414. The processor core 413 can include an arithmetic logic unit (ALU), a floating point unit (FPU), a digital signal processing core (DSP Core), or any combination thereof. A memory controller 415 can also be used with the one or more processors 410, or in some implementations the memory controller 415 can be an internal part of the processor 410.

Depending on the desired configuration, the system memory 420 may be of any type including but not limited to volatile memory (such as RAM), non-volatile memory (such as ROM, flash memory, etc.) or any combination thereof. The system memory 420 may include an operating system 421, one or more applications 422, and program data 424. The one or more applications 422 may include program translation module application 423 that can be arranged to perform the functions, actions, and/or operations as described herein including the functional blocks, actions, and/or operations described herein. The program data 424 may include modulation and optimization data 425 for use with program translation module application 423. In some example embodiments, the one or more applications 422 may be arranged to operate with the program data 424 on the operating system 421. This described basic configuration 401 is illustrated in FIG. 4 by those components within dashed line.

Computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The one or more data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 420, the removable storage 451 and the non-removable storage 452 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 442 for facilitating communication from various interface devices (e.g., output interfaces, peripheral interfaces, and communication interfaces) to the basic configuration 401 via the bus/interface controller 440. Example output interfaces 460 may include a graphics processing unit 461 and an audio processing unit 462, which may be configured to communicate to various external devices such as a display or speakers via one or more A/V ports 463. Example peripheral interfaces 470 may include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.)

via one or more I/O ports 473. An example communication interface 480 includes a network controller 481, which may be arranged to facilitate communications with one or more other computing devices 483 over a network communication via one or more communication ports 482. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 400 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 400 may also be implemented as a personal computer including both laptop computer and non-laptop computer configurations. In addition, the computing device 400 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Some implementations described herein may be in hardware, such as employed to operate on a device or combination of devices, for example, whereas other implementations may be in software and/or firmware. Likewise, although claimed subject matter is not limited in scope in this respect, some implementations may include one or more articles, such as a storage medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of storage medium used to actually carry out the distribution. Examples of a storage medium include, but are not limited to, the following: a recordable type medium such as a flexible disk, a hard disk drive (HDD), a Compact Disc (CD), a Digital Versatile Disk (DVD), a digital tape, a computer memory, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method comprising:
   receiving an intermediate representation (IR) of machine executable instructions;
   optimizing the received IR to generate a first optimized IR prior to the machine executable instructions being generated by a runtime compiler;
   generating two or more alternative optimized IRs which are optimized at different optimization points based at least in part on information generated during execution of the first optimized IR in a runtime environment, wherein one of the two or more alternative optimized IRs is randomly optimized at a predetermined percentage below a full optimization; and modulating between the generated two or more alternative optimized IRs during execution of the machine executable instructions at a frequency based at least in part on a degree of difference between the two or more alternative optimized IRs.

2. The method of claim 1 further comprising storing the two or more alternative optimizations for the IRs.

3. The method of claim 2, wherein the run-time compiler comprises a Just-in-Time (JIT) compiler.

4. The method of claim 1, wherein receiving the IR comprises receiving byte-code.

5. The method of claim 1, wherein receiving the IR comprise receiving virtual machine type instructions.

6. The method of claim 1, wherein said modulating comprises utilizing, in a random manner, the two or more alternative optimizations for the IRs.

7. The method of claim 1, wherein said modulating comprises utilizing, in a random time dependent manner, the two or more alternative optimizations for the IRs.

8. A machine readable non-transitory medium having stored therein instructions that, when executed by one or more processors, operatively enable a programming translation module to:
receive an intermediate representation (IR) of machine executable instructions;
optimize the received IR to generate a first optimized IR prior to the machine executable instructions being generated by a runtime compiler;
generating two or more alternative optimized IRs which are optimized at different optimization points based at least in part on information generated during execution of the first optimized IR in a runtime environment, wherein one of the two or more alternative optimized IRs is randomly optimized at a predetermined percentage below a full optimization; and
modulate between the generated two or more alternative optimized IRs during execution of the machine executable instructions at a frequency based at least in part on a degree of difference between the two or more alternative optimized IRs.

9. The machine-readable non-transitory medium of claim 8, wherein the stored instructions, that when executed by one or more processors, further operatively enable the programming translation module to store the two or more alternative optimizations for the IR.

10. The machine-readable non-transitory medium of claim 8, wherein the stored instructions, that when executed by one or more processors, further operatively enable the programming translation module to receive the IR at a Just-in-Time (JIT) compiler.

11. The machine-readable non-transitory medium of claim 8, wherein the stored instructions, that when executed by one or more processors, further operatively enable the programming translation module to receive byte-code.

12. The machine-readable non-transitory medium of claim 8, wherein the stored instructions, that when executed by one or more processors, further operatively enable the programming translation module to receive virtual machine type instructions.

13. The machine-readable non-transitory medium of claim 8, wherein the stored instructions, that when executed by one or more processors, further operatively enable the programming translation module to modulate, in a random manner, the two or more alternative optimizations for the IR.

14. The machine-readable non-transitory medium of claim 8, wherein the stored instructions, that when executed by one or more processors, further operatively enable the programming translation module to modulate, in a random time dependent manner, the two or more alternative optimizations for the IR.

15. A system for utilizing an intermediate representation (IR), comprising:
a processor;
a programming translation module communicatively coupled to the processor; and
a machine readable medium having stored therein instructions that, when executed by the processor, operatively enable the programming translation module to:
receive an intermediate representation (IR) of machine executable instructions;
optimize the received IR to generate a first optimized IR prior to the machine executable instructions being generated by a runtime compiler;
generating two or more alternative optimized IRs which are optimized at different optimization points based at least in part on information generated during execution of the first optimized IR in a runtime environment, wherein one of the two or more alternative optimized IRs is randomly optimized at a predetermined percentage below a full optimization; and
modulate between the generated two or more alternative optimized IRs during execution of the machine executable instructions at a frequency based at least in part on a degree of difference between the two or more alternative optimized IRs.

16. The system of claim 15, wherein the stored instructions, that when executed by the processor, further operatively enable the programming translation module to store the two or more alternative optimizations for the IR.

17. The system of claim 15, wherein the stored instructions, that when executed by the processor, further operatively enable the programming translation module to receive the IR at a Just-in-Time (JIT) compiler.

18. The system of claim 15, wherein the stored instructions, that when executed by the processor, further operatively enable the programming translation module to receive byte-code.

19. The system of claim 15, wherein the stored instructions, that when executed by the processor, further operatively enable the programming translation module to receive virtual machine type instructions.

20. The system of claim 15, wherein the stored instructions, that when executed by the processor, further operatively enable the programming translation module to modulate, in a random manner, the two or more alternative optimizations for the IR.

21. The system of claim 15, wherein the stored instructions, that when executed by the processor, further operatively enable the programming translation module to modulate, in a random time dependent manner, the two or more alternative optimizations for the IR.

* * * * *